United States Patent Office 3,113,832
Patented Dec. 10, 1963

3,113,832
COMPLEX BOROHYDRIDES AND A PROCESS FOR THEIR PREPARATION AND USE
János Kollonitsch, Budapest, Oszkár Fuchs, Dunakeszi, and Valeria Gábor, Budapest, Hungary, assignors to Gyogyszeripari Kutato Intezet, Budapest, Hungary
No Drawing. Filed May 14, 1954, Ser. No. 429,974
Claims priority, application Hungary May 19, 1953
13 Claims. (Cl. 23—14)

The invention relates to complex borohydrides of the general formula $$M(BH_4)_n$$

where M is a metal and $n$ is the valency of the metal M, and it also relates to processes for the preparation of said borohydrides.

It is an object of the invention to provide new complex borohydrides of alkaline earth metals, i.e. calcium, strontium and barium, respectively.

These new compounds can be prepared by reacting an alkali-borohydride with a salt of an alkali earth metal in a solvent. The alkali borohydride may be sodium or potassium borohydride and the salt of an alkali earth metal may be a halide, e.g. chloride or bromide.

The solvent may be an anhydrous ether such as tetrahydrofurane or an amine such as isopropylamine or cyclohexylamine, but the reaction may be very satisfactorily carried out in an alcohol, preferably in lower aliphatic alcohols, such as methanol or ethanol. This fact is surprisingly as according to the prior art (see D. T. Hurd: ("An Introduction to the Chemistry of the Hydrides," 1952, page 163) ". . . lithium borohydride . . . is rapidly decomposed by water and alcohols" and even in an anhydrous alcoholic medium alcoholysis takes place decomposing the complex compounds. In fact, hitherto lithium and magnesium borohydrides have been always prepared in media consisting of abs. ether, abs. isopropylamine and other rather expensive hydroxyl-free solvents, some of which require very careful handling.

These new alkaline earth borohydrides show a relatively high stability in an anhydrous alcohol, preferably ethanol up to temperatures of about 0 centigrade and even up to +10 centigrade. In the preparation of calcium borohydride the preferred temperature lies between —15 and —30° C.

Reacting an alkali borohydride with a salt of an alkaline earth metal the alkali salt formed with the anion of the alkaline earth metal is precipitated in alcoholic solution, and the precipitate can be separated from the solution e.g. by means of filtering or centrifuging, whereafter the complex alkaline earth borohydride can be recovered from the separated solution by evaporating the solvent. The evaporation has to be carried out at temperatures below 0 centigrade, preferably in the range of —30 and —50° C. and under high vacuo. In this manner the alkaline earth borohydrides can be obtained in solid state.

Another method for the recovery of the alkaline earth borohydrides consists in evaporating the solvent from the reaction mixture and treating the residue with a selective solvent for the alkaline earth metal borohydride, i.e. with a solvent which does not dissolve the alkali metal salt formed by the reaction. Examples of these selective solvents are the lower aliphatic amines such as isopropyl amine, cycloaliphatic amines, tetrahydrofurane and anhydrous liquid ammonia. By evaporating the solvent the complex alkaline earth borohydrides may be obtained in solid form.

The reaction between an alkali borohydride and an alkaline earth salt in alcoholic medium takes place in a very short time, whereas the reaction rate in hydroxyl- free solvents is lower but the complex alkaline earth borohydrides are, generally, more stable in such solvents and, therefore, it is not necessary to maintain as low a temperature during the evaporation of the solvent as is needed in the evaporation of alcohols.

A further object of the invention is to provide a new composition of matter comprising an alcoholic solution of a complex borohydride of the general formula $M(BH_4)_n$, where M is a metal of the group consisting of calcium, strontium, barium, magnesium and lithium. The alcoholic solution of the complex borohydrides of the above mentioned metals can be prepared by reacting an alkali borohydride with a salt of the above mentioned metals, preferably with a halide, e.g., chloride in an alcoholic medium. Preferably lower aliphatic alcohols, such as methanol or ethanol can be used. Polyvalent alcohols such as glycols may also be used. The reaction takes place at low temperatures and the reaction rate is high. The alkaline salt formed during the reaction is insoluble in alcohol and is precipitated. The process can be carried out at room temperature, but preferably at temperatures below 0 centigrade. The preferred and most suitable temperature is dependent on the stability of the desired complex metal borohydride in the respective alcoholic medium. For the preparation of the calcium borohydride —15 to —30 centigrade, whereas for magnesium borohydride —50 centigrade is preferable in ethanol solution. In the case of lithium borohydride the reaction can be carried out between 0 and —20° C. This compound is stable in methanol solution at —10° C. but is decomposed at +10°, whereas the solution in ethanol is stable at the last mentioned temperature. The alcoholic solutions can be used as reducing agents in organic synthesis without separating the complex borohydrides from the solution which is a great advantage in handling these delicate compounds.

Reacting an alkali borohydride with a salt of an alkaline earth metal in an ether, such as for instance tetrahydrofurane and evaporating the solvent, the residue contains the addition compound formed by the alkaline earth metal borohydride and the ether. In this manner the addition product formed by calcium borohydride with an ether, in particular with tetrahydrofurane can be prepared. This is the more conspicuous as both reactants are insoluble in ethers, in particular in tetrahydrofurane. The addition product can be separated from the alkali salt formed during the reaction, in the previously stated manner.

It is an object of this invention to provide the above mentioned new addition compound.

A still further object of the invention comprises the use of the alkaline earth metal borohydrides, i.e. Ca, Sr, Ba and Mg borohydrides for the reduction of organic carbonyl compounds such as aldehydes and ketones. Such a reaction may be carried out with the isolated compounds themselves but also with their solutions, and also with the same solutions in which the respective borohydrides have been prepared.

Example 1

0.38 g. sodium borohydride is dissolved in 20 ml. abs. ethanol, cooled to —10 centigrade and a similarly cooled solution of 0.43 g. lithium chloride in 10 ml. abs. ethanol is poured into the same. Sodium chloride instantaneously separates from the mixture which is left to stand for half an hour, thereafter filtered by suction by means of a cooled filter and washed with abs. ethanol. 0.52 g. sodium chloride precipitate is obtained on the filter whereas, in the solution, 92% of the theoretically calculated amount of the lithium borohydride are present. The determination is based on volumetric assay of the amount of hydrogen developed by way of decomposition of a sample of the solution, decomposition being effected with diluted acid.

The solution obtained in this example can directly be employed as a reducing agent, for instance for the reduction of carbonyl compounds.

*Example 2*

0.55 g. anhydrous calcium chloride is dissolved in 17 ml. abs. ethanol and the solution is cooled to —25 centigrade. 0.38 g. sodium borohydride is dissolved in 15 ml. abs. ethanol and poured into the first solution whereby sodium chloride separates at once. The reaction mixture is cooled to about —30 centigrade and the precipitate separated therefrom by means of suction or centrifuging. The suction filter or the centrifuge have to be cooled to about —30 centigrade. The clear filtrate consists of a solution of calcium borohydride in ethanol and can be directly used for the reduction of carbonyl compounds.

*Example 3*

The filtrate obtained according to Example 2 is evaporated under a vacuo of $1\mu$/Hg from a bath maintained at —30 centigrade. In order to maintain a good vacuum, it is preferably to cool the receiver to about —80 centigrade. The residue, a white solid substance comprises the new compound calcium borohydride.

*Example 4*

0.55 g. anhydrous calcium chloride and 0.38 g. sodium borohydride are reacted in abs. ethanol as set forth in Example 2. The resulting two-phase reaction mixture comprises solid sodium chloride and a solution of calcium borohydride in ethanol. The mixture is evaporated to dryness under cooling as set forth in Example 3. The residue is a solid mixture comprising sodium chloride and calcuim borohydride and can be further used without purification.

*Example 5*

The solid mixture obtained according to Example 4 is extracted with 5 ml. isopropylamine. The solution is separated from the undissolved residue consisting of sodium chloride. The clear filtrate may directly be employed as a reducing agent. By evaporation of the solvent, solid calcium borohydride may be obtained.

*Example 6*

1.90 g. sodium borohydride (purified by means of recrystallization, in isopropylamine) and 2.75 g. anhydrous calcium chloride, both finely pulverized, are mixed with 100 ml. tetrahydrofurane which has been freshly distilled with metallic sodium. By means of a magnetic stirrer or a ball mill, the mixture is stirred for 10 hours in nitrogen atmosphere and the temperature of the mixture is maintained at about +30 centigrade. Thereafter the mixture is left to stand for the night, then centrifuged, the excess of tetrahydrofurane evaporated under vacuo and the residue dried in vacuo at about +30° C. to constant weight. If a precipitate appears during evaporation, the centrifuging has to be repeated and always to be effected in a closed vessel.

The obtained white powder is the new addition compound formed by calcium borohydride with tetrahydrofurane. It is well soluble in tetrahydrofurane and in isopropylamine respectively, but less soluble in diethylether.

*Example 7*

0.48 g. anhydrous magnesium chloride is dissolved in 20 ml. abs. ethanol and the solution is coled to —60 centigrade. Another similarly cooled solution is prepared by dissolving 0.38 g. sodium borohydride in 15 ml. abs. ethanol and this solution is poured into the first solution. The reaction mixture is left to stand for half an hour, thereafter separated from the precipitated sodium chloride by means of a cooled glass suction filter provided with a protecting tube containing calcium-chloride. The temperature of the filter has to be maintained at about —50 centigrade. 0.52 g. sodium chloride precipitate is obtained on the filter, whereas the ethanolic solution contains 92% of the theoretically calculated magnesium borohydride.

If desired the solid magnesium borohydride can be recovered from the ethanolic solution by evaporation of the solvent as set forth in Example 3. The evaporation has to be effected under a vacuo of about $1\mu$/Hg., at a temperature of about —40 centigrade, whereas the receiver has to be cooled to about —80 to —100 centigrade.

*Example 8*

To 15 ml. of a solution of calcium borohydride obtained according to Example 2, cooled to —15 centigrade, 6.04 g. p-nitrobenzaldehyde is added in 3 portions. The mixture is stirred for 2 and ½ hours at —15 centigrade and left to stand for the night without cooling. Thereafter the pH of the mixture is adjusted to 5 with 5 N HCl, 100 ml. water added to same and the mixture is slightly heated in order to obtain a clear solution which is cooled again, whereby p-nitrobenzyl alcohol is obtained in form of crystalline needles. The substance is filtered by suction and washed with some aqueous alcohol. Pure p-nitrobenzyl alcohol is recovered in nearly theoretical yield.

*Example 9*

0.055 g. calcium chloride is dissolved in 4 ml. abs. ethanol and the solution cooled to —30 centigrade. 0.038 g. sodium borohydride is dissolved in 6 ml. abs. ethanol, cooled to —30 centigrade and added to the first solution. The mixture is stirred for half an hour at —30 centigrade, whereafter the solution is separated from the sodium chloride which precipitates, in a nearly theoretical amount. To the calcium borohydride solution hereby obtained, a solution of 0.288 g. dehydroandrosterone in in 5 ml. ethanol is added. The reaction mixture is left to stand at —30 to —20 centigrade for about 2½ hours, thereafter the temperature left to rise to room temperature. 15 ml. water is added to the solution which is acidified with 5 N HCl, shaken with 5×15 ml. chloroform, the chloroform solution washed with water until neutral reaction, dried over magnesium sulfate and concentrated by evaporation.

The residue comprising $3\beta$-$\Delta 4$-$17\beta$-androstenediole is washed with some ether. The product melts at 178–182 centigrade.

What we claim is:

1. As a new composition of matter, the alcoholic solution of the complex metal borohydride of the general formula $$M(BH_4)_2$$

where M is a metal of the group consisting of Ca, Sr, Ba, said solution having a temperature not exceeding 10° C.

2. A composition of matter as claimed in claim 1, in which the alcoholic solvent is selected from the group consisting of methyl alcohol and ethyl alcohol.

3. As a new composition of matter, an ethanolic solution of lithium borohydride, said solution having a temperature not exceeding 10° C.

4. A process for the preparation of complex metal borohydrides of the general formula $$M(BH_4)_2$$

where M is a metal of the group consisting of Ca, Sr, Ba, Mg, respectively, in which an alkali metal borohydride is reacted with a salt of the above said metals and the reaction is carried out in an alcoholic medium at temperatures below 0° C., with the formation and precipitation of the corresponding alkali salt, which is then separated from the solution, whereupon the alcohol is driven off from said solution and evaporated under high vacuum below 0° C.

5. A process as claimed in claim 4, in which the salt of M is a halide.

6. A process as claimed in claim 4, in which the salt of M is a chloride.

7. A process for the preparation of calcium borohydride according to claim 4, in which sodium borohydride is reacted with a calcium halide.

8. A process according to claim 7, in which the reaction is carried out in anhydrous ethanol at temperatures below 0 centigrade, the precipitated Na-halide is separated from the alcoholic solution and the solvent is distilled off in vacuo at temperatures below 0 centigrade.

9. A process for the preparation of complex metal borohydrides of the general formula $$M(BH_4)_2$$

wherein M is a metal selected from the group consisting of Ca, Sr, Ba, Mg, in which an alkali metal borohydride is reacted with a salt of M in alcoholic medium below 0° C., the precipitated alkali salt is separated from the solution of the resulting complex metal borohydride and the alcohol is distilled off in vacuo at a temperature below 0° C.

10. A process for the preparation of complex metal borohydrides of the general formula $$M(BH_4)_2$$

wherein M indicates a metal selected from the group consisting of Ca, Sr, Ba, Mg, in which an alkali borohydride is reacted with a salt of M in an alcoholic medium below 0° C., the alcohol is distilled off below 0° C. and the residue extracted with a hydroxyl-free solvent for dissolving the complex metal borohydride, whereupon the solution is separated and said solvent is evaporated.

11. A process for the preparation of calcium borohydride, in which a calcium halide is reacted with sodium borohydride in anhydrous ethanol below 0° C., the ethanol is distilled off in vacuo at a temperature below 0° C., the residue is treated with a solvent for dissolving the calcium borohydride, the solution is separated from the sodium halide and subsequently the solvent is distilled off.

12. A process for the preparation of calcium borohydride according to claim 4, in which sodium borohydride is reacted with calcium chloride.

13. The white solid addition compound of calcium borohydride with tetrahydrofuran prepared by evaporating a solution of calcium borohydride in tetrahydrofuran under vacuo to remove excess tetrahydrofuran and thereby produce a solid residue, and then subjecting said residue to heating for a period of time sufficient to convert it to the dry state.

References Cited in the file of this patent

UNITED STATES PATENTS

| | | |
|---|---|---|
| 2,448,047 | Peppel | Aug. 31, 1948 |
| 2,567,972 | Schlesinger et al. | Sept. 18, 1951 |
| 2,575,403 | Young et al. | Nov. 20, 1951 |
| 2,726,926 | Paul et al. | Dec. 13, 1955 |
| 2,729,540 | Fischer | Jan. 3, 1956 |

OTHER REFERENCES

Sedgwick: "The Chemical Elements and Their Compounds," 1950, vol. 1, page 366.

Wiberg: "Angewandte Chemie," vol. 64, pp. 354–355 (1952).

Kollonitsch et al.: Nature, Feb. 19, 1955, vol. 175, page 346.

Schlesinger et al.: J. Am. Chem. Soc., Jan. 5, 1953, vol. 75, page 209.

Kollonitsch et al.: Nature, Jan. 16, 1954, vol. 173, pages 125–6.

Hurd: "An Introduction to the Chemistry of the Hydrides," New York, John Wiley and Sons, Inc., 1952, page 44.

Wiberg et al.: "Zeitschrift für Naturforschung," Band 56, 1950, page 397.